(12) United States Patent
Shiffler

(10) Patent No.: US 9,429,822 B2
(45) Date of Patent: Aug. 30, 2016

(54) CAMERA AND ACCESSORY MOUNTING ADAPTER

(71) Applicant: Michael Shiffler, Gilbert, AZ (US)

(72) Inventor: Michael Shiffler, Gilbert, AZ (US)

( * ) Notice: Subject to any disclaimer, the term of this patent is extended or adjusted under 35 U.S.C. 154(b) by 0 days.

(21) Appl. No.: 14/660,100

(22) Filed: Mar. 17, 2015

(65) Prior Publication Data

US 2015/0261071 A1    Sep. 17, 2015

Related U.S. Application Data

(60) Provisional application No. 61/954,356, filed on Mar. 17, 2014.

(51) Int. Cl.
*G03B 17/00*    (2006.01)
*G03B 17/56*    (2006.01)

(52) U.S. Cl.
CPC .......... *G03B 17/561* (2013.01); *G03B 17/566* (2013.01)

(58) Field of Classification Search
CPC ...... G03B 17/00; G03B 17/56; F16M 11/00; F16M 11/04; F16M 13/04
USPC ................. 396/422; 248/187.1; 348/375
See application file for complete search history.

(56) References Cited

U.S. PATENT DOCUMENTS

2011/0069472 A1*  3/2011  Peregrine ............... G03B 15/02
                                                          362/11

* cited by examiner

*Primary Examiner* — Walter L Lindsay, Jr.
*Assistant Examiner* — Fang-Chi Chang

(57) ABSTRACT

A camera and accessory mounting adapter is a device that allows the user to mount a camera as well as various accessories to the end of a boom, pole, or similar device. The device features a prism body with an adapter mounting cavity and female threading for attaching the device to the boom, pole, or similar device. A threaded fastener may be inserted into a hex head bolt receiving hole within the prism body, allowing a camera to be mounted to the prism body. At least one cold shoe mount is present for attaching a cold/hot shoe-compatible accessory to the prism body. A secondary camera mount allows the user to mount an additional camera to the device. Various other accessories may be mounted to the device via an accessory mounting port traversing through the prism body.

17 Claims, 9 Drawing Sheets

SECTION A-A

SECTION B-B

CAMERA AND ACCESSORY MOUNTING ADAPTER

The current application claims a priority to the U.S. Provisional Patent application Ser. No. 61/954,356 filed on Mar. 17, 2014.

FIELD OF THE INVENTION

The present invention relates generally to an adapter for mounting cameras as well as other photography equipment and accessories. More specifically, the present invention is a camera and accessory mounting adapter that allows the user to mount a camera and/or various types of photography equipment and accessories to the end of a boom, pole, or similar device.

BACKGROUND OF THE INVENTION

The quality of a photograph is subject to a large number of factors. One of the most important factors in photography and videography is lighting. Lighting quality is generally contingent on the environment in which a photo shoot is taking place. Additionally, a photographer is able to manipulate the lighting of a photo shoot according to his or her vision for the photo shoot. A large variety of photography equipment and accessories are available to a photographer who wishes to manipulate a photo shoot environment. The flash unit is one of the most common lighting accessories and is often mounted directly to a camera via a hot shoe. A hot shoe features an electrical connection that allows an attached flash unit to fire upon the camera capturing an image. In contrast to camera-mounted flash units, studio lighting is generally adjustable as needed in order to achieve the appropriate level of lighting on a photo subject. As such, studio lighting is often mounted to a stand or to a handheld device such as a boom, allowing the lighting to be easily maneuvered and adjusted. This is particularly useful when a camera or lighting unit must be positioned above one or more subjects, such as during a large event. Similar to studio lighting units, microphones are often mounted to stands or booms in videography. A subject in a video shoot is often required to wear a microphone in order to increase the clarity and audibility of his or her speech. However, when this is not possible, a microphone is positioned in close proximity to the subject outside of the camera's field of view. The present invention seeks to enhance and improve upon conventional means of mounting and adjusting photography and videography equipment and accessories in order to manipulate a shoot environment.

The present invention is a camera and accessory mounting adapter to which a camera may be attached, along with various types of photography equipment and accessories. The present invention is attachable to a boom, pole, or similar device. This allows the present invention, an attached camera, and/or any attached equipment and accessories to be positioned and adjusted according to the user's needs in order to manipulate a shoot environment. In addition to a camera, various types of equipment and accessories may be mounted to the present invention including, but not limited to, flash units, continuous lighting units, LED lighting units, microphones, and umbrella-style reflectors.

DETAIL DESCRIPTIONS OF THE INVENTION

Figure 1:
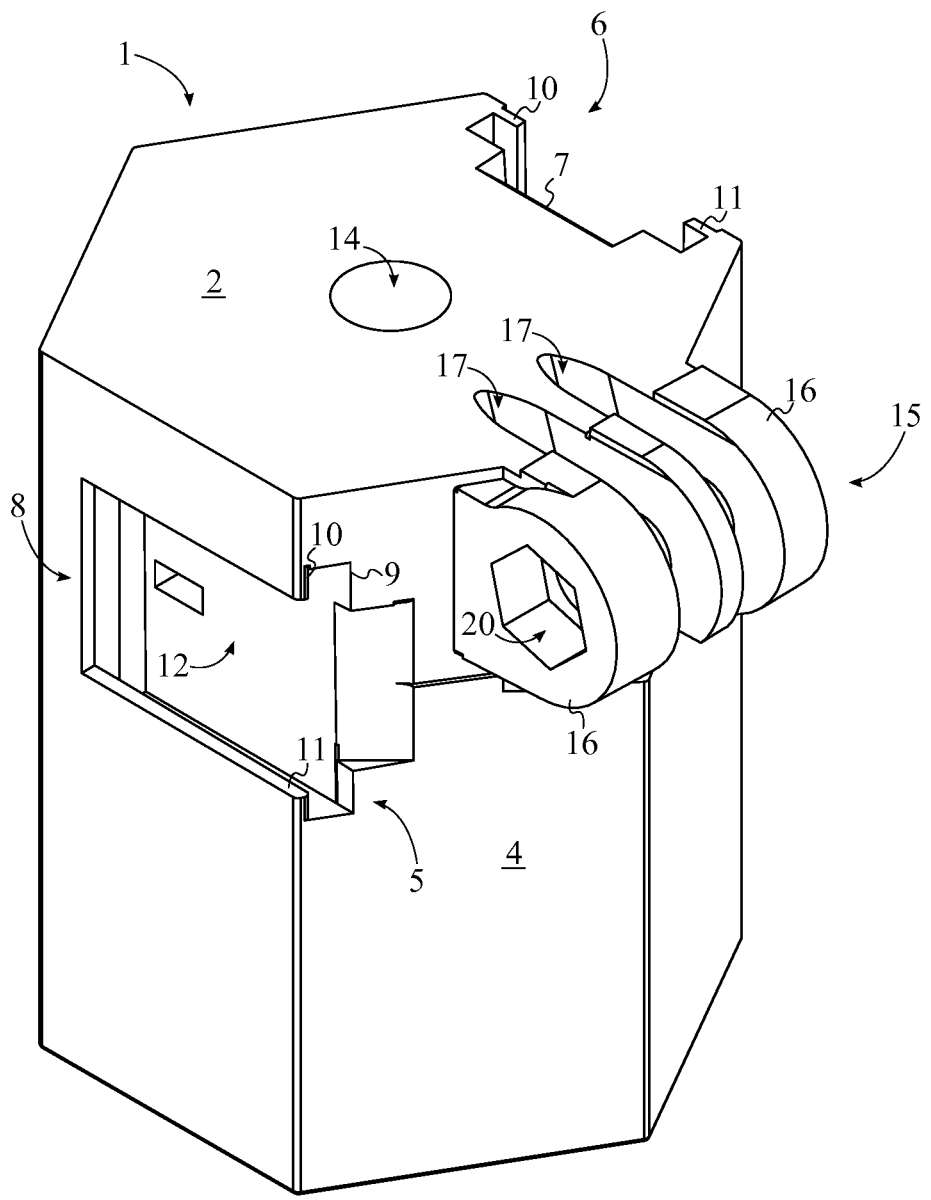
FIG. 1 is a top-rear-right perspective view of the present invention.

All illustrations of the drawings are for the purpose of describing selected versions of the present invention and are not intended to limit the scope of the present invention.

The present invention is a camera and accessory mounting adapter that allows the user to mount a camera and/or various types of photography equipment and accessories to the end of a boom, pole, or similar device. The present invention is shown in FIGS. 1-9 and comprises a prism body 1, at least one cold shoe mount 5, a female threading 13, a hex head bolt receiving hole 14, an adapter mounting cavity 18, and an accessory mounting port 19.

Figure 5:
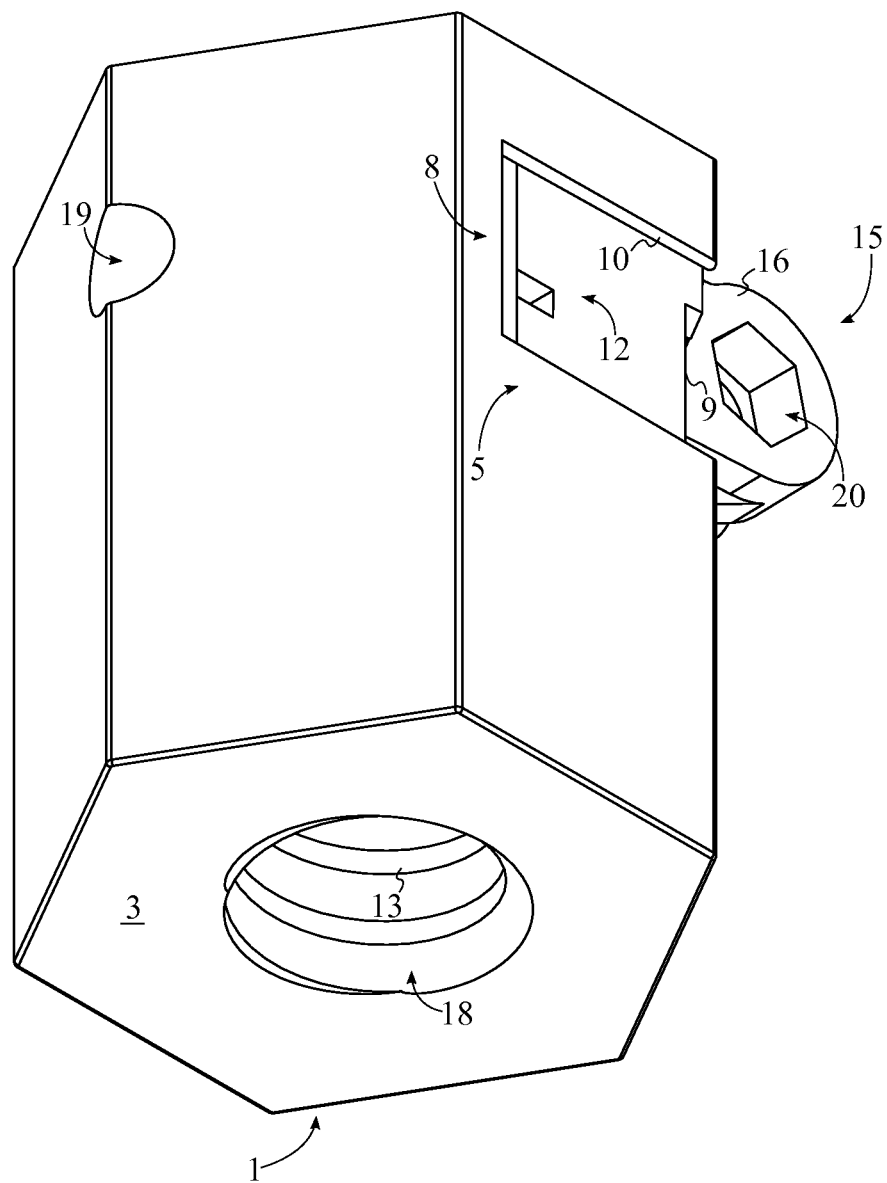
FIG. 5 is a bottom-front-right perspective view of the present invention.
Figure 6:
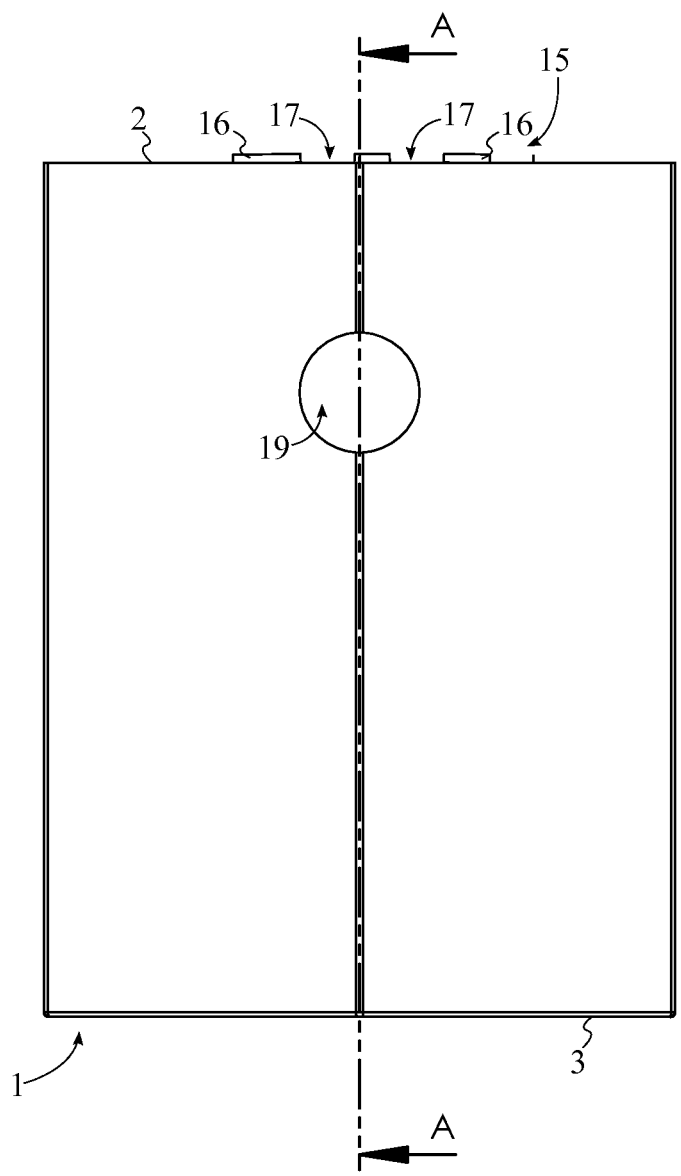
FIG. 6 is a front view of the present invention.
Figure 7:
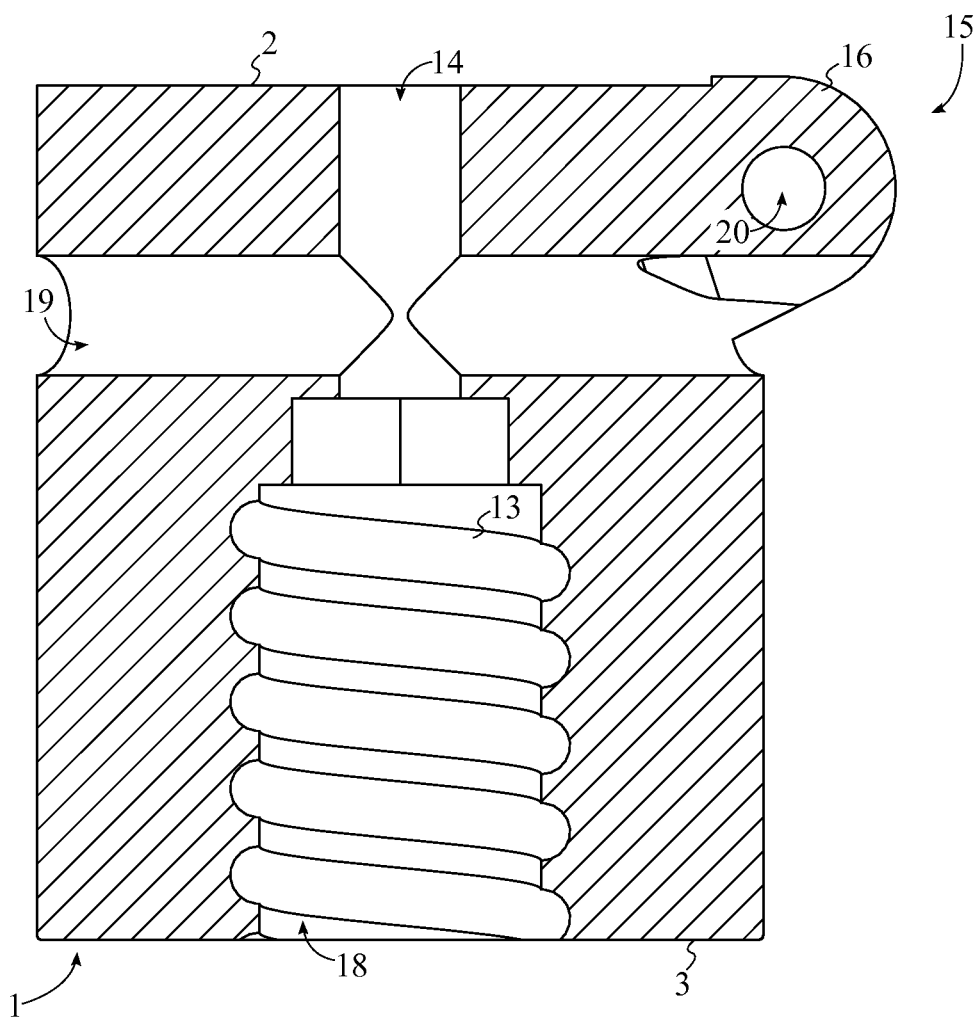
FIG. 7 is a cross-sectional view of the present invention taken along line A-A of FIG. 6.
Figure 8:
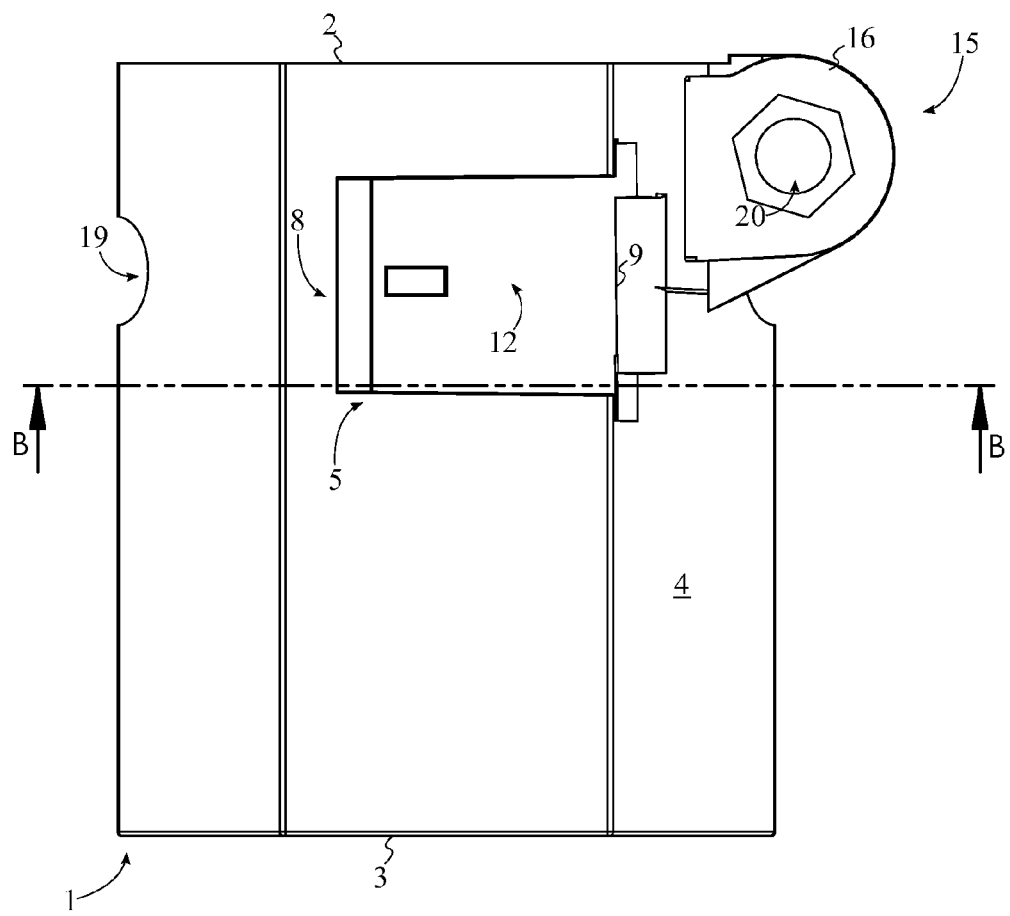
FIG. 8 is a right-side view of the present invention.

The prism body 1 is the body onto and into which a camera and/or various types of photography equipment and accessories are mounted and inserted. The prism body 1 comprises a first base 2 and a second base 3 as shown in FIGS. 1-5. The first base 2 and the second base 3 are opposing surfaces of the prism body 1. The adapter mounting cavity 18 is the cavity into which the boom, pole, or similar device may be inserted when attaching the present invention to boom, pole, or similar device. The adapter mounting cavity 18 traverses into the prism body 1 from the second base 3 as shown in FIG. 5 and FIG. 7. As such, the boom, pole, or similar device may be inserted through the second base 3 and into the prism body 1. The female threading 13 is utilized to secure the boom, pole, or similar device to the present invention while allowing the present invention to be removed as needed. The female threading 13 is helically integrated into the adapter mounting cavity 18, allowing the boom, pole, or similar device to be screwed into the adapter mounting cavity 18.

The at least one cold shoe mount 5 allows any piece of equipment or accessory that is mountable to a conventional hot shoe or cold shoe mount to be mounted to the present invention. The at least one cold shoe mount 5 is laterally integrated into the prism body 1, allowing the piece of equipment or accessory to be secured to the exterior of the prism body 1. The accessory mounting port 19 allows a piece of equipment or accessory such as an umbrella-style reflector to be inserted and secured to the prism body 1. As shown in FIG. 7, the accessory mounting port 19 laterally traverses through the prism body 1 which allows the piece of equipment or accessory to be securely mounted into and through the prism body 1. The accessory mounting port 19 is oriented perpendicular to the adapter mounting cavity 18 and the hex head bolt receiving hole 14 as shown in FIG. 7. This allows a piece of equipment or accessory mounted into the accessory mounting port 19 to be oriented perpendicular to the mounted camera and to the boom, pole, or similar device to which the present invention is mounted. Furthermore, the hex head bolt receiving hole 14 is intersected by the accessory mounting port 19. This allows a piece of equipment or accessory inserted into the accessory mounting port 19 to pass through the hex head bolt receiving hole 14, provided that a threaded fastener is not inserted into the hex head bolt receiving hole 14.

Figure 9:
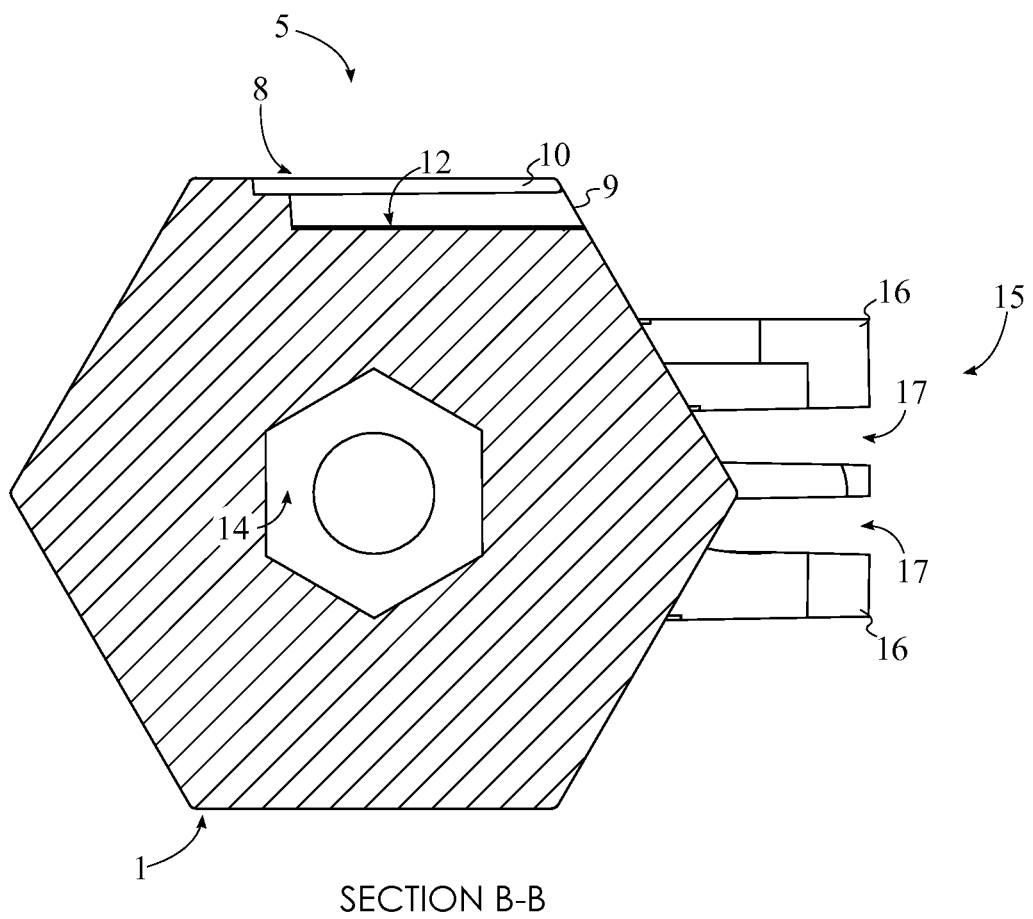
FIG. 9 is a cross-sectional view of the present invention taken along line B-B of FIG. 8.

With reference to FIG. 7 and FIG. 9, the hex head bolt receiving hole 14 is a space within the prism body 1 into which a hex head bolt or similar threaded fastener may be inserted. The threaded portion of the fastener is then able to protrude from the first base 2, allowing a camera to be screwed onto the threaded portion. The hex head bolt receiving hole 14 traverses through the prism body 1 from the adapter mounting cavity 18 and the first base 2 as shown in FIG. 7. This allows the threaded fastener to be inserted into the prism body 1 from the second base 3 and through the adapter mounting cavity 18. Additionally, the threaded fastener may be held securely in place within the prism body 1 by the boom, pole, or similar device to which the present invention is mounted, preventing the threaded fastener from falling out of the prism body 1.

Figure 2:
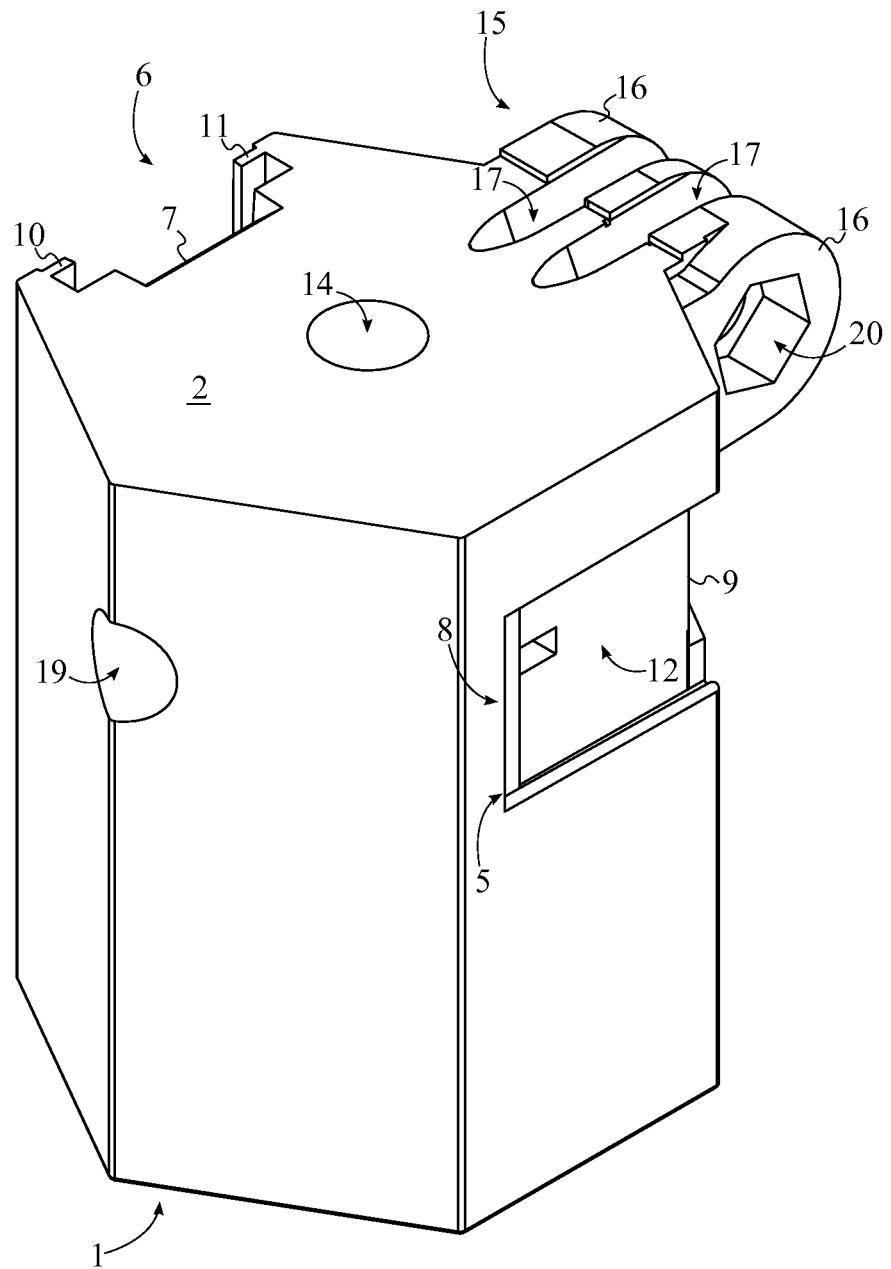
FIG. 2 is a top-front-right perspective view of the present invention.
Figure 3:
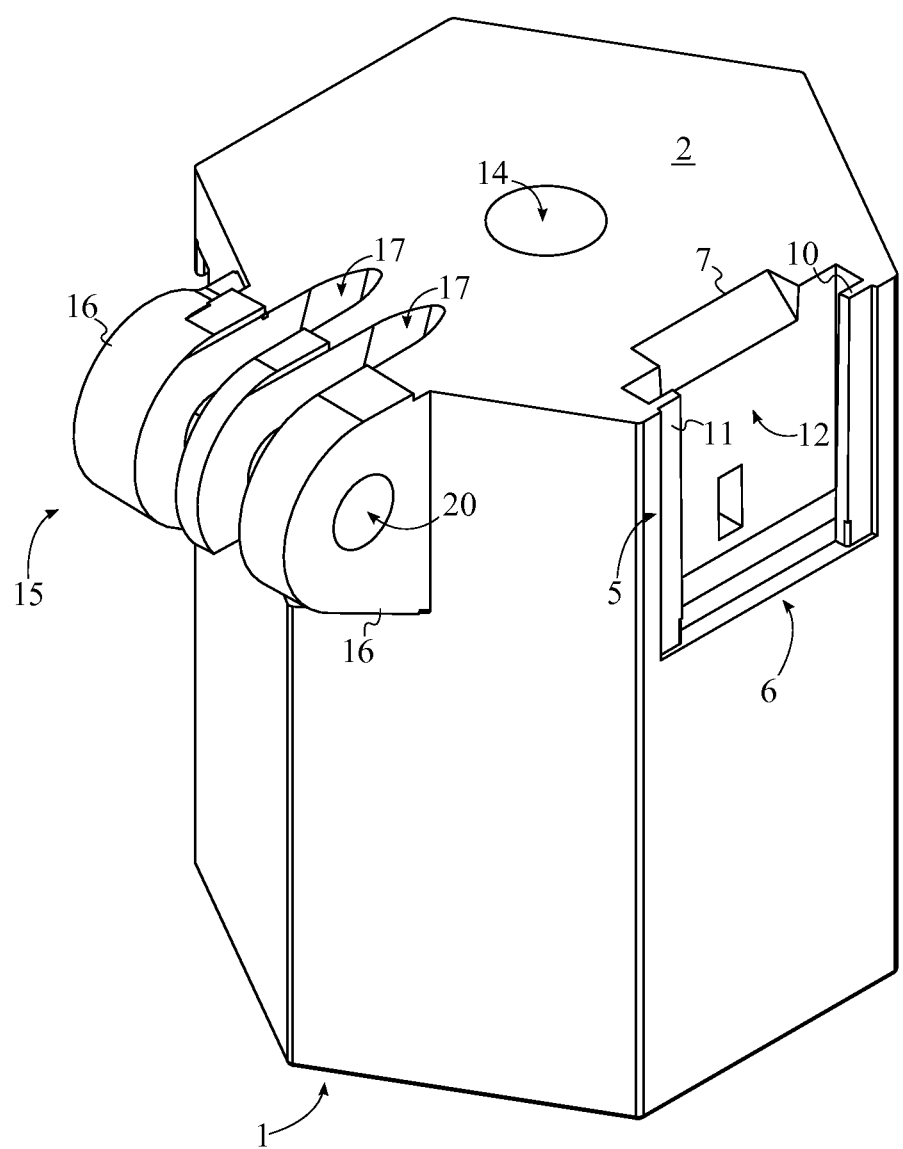
FIG. 3 is a top-rear-left perspective view of the present invention.
Figure 4:
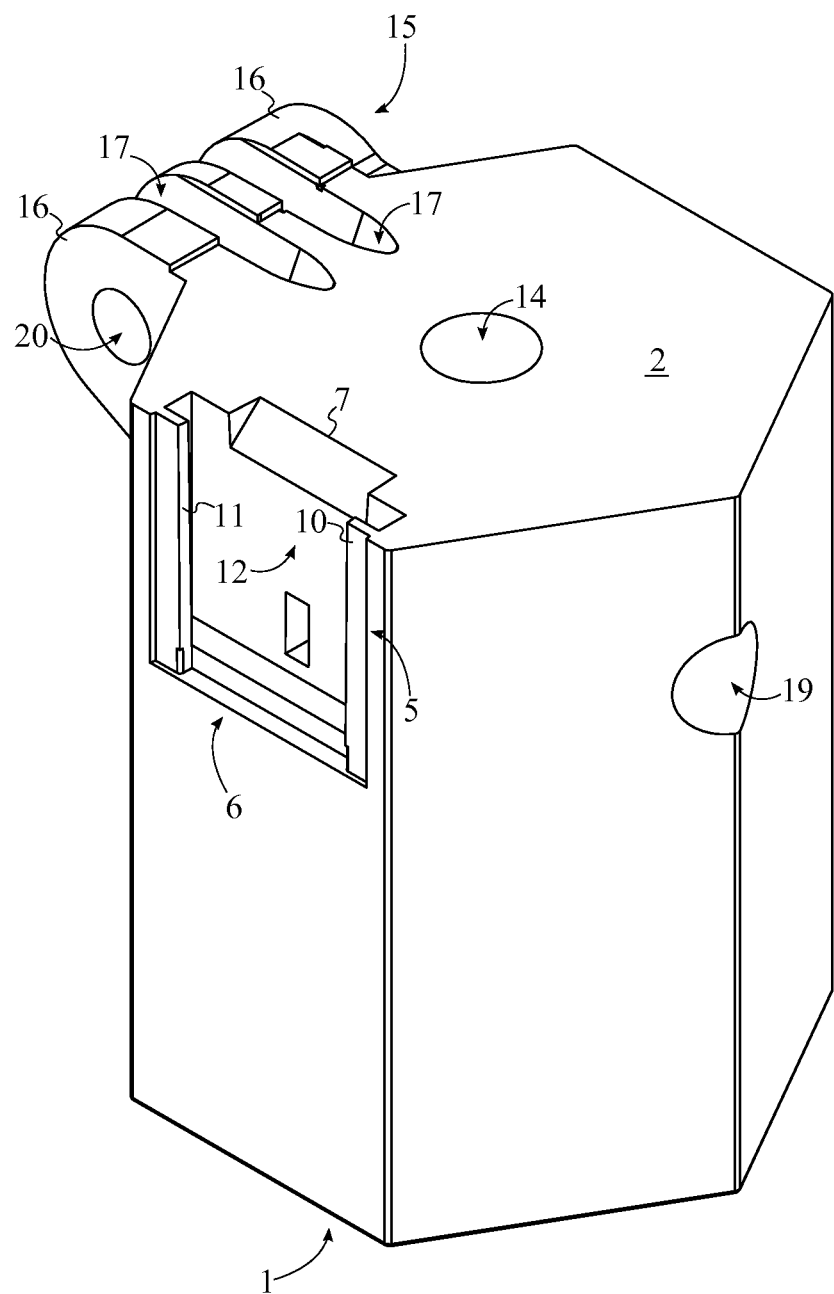
FIG. 4 is a top-front-left perspective view of the present invention.

In the preferred embodiment of the present invention, the at least one cold shoe mount 5 comprises a first cold shoe mount 6 and a second cold shoe mount 8. The first cold shoe mount 6 and the second cold shoe mount 8 allow two pieces of equipment or accessories that are mountable to conventional hot shoe or cold shoe mounts to be mounted to the prism body 1. The first cold shoe mount 6 is laterally integrated into the prism body 1 while the second cold shoe mount 8 is laterally integrated into the prism body 1, opposite to the first cold shoe mount 6. This ensures that a piece of equipment or accessory that is mounted into the first cold shoe mount 6 does not physically impair or interfere with a piece of equipment or accessory that is mounted into the second cold shoe mount 8. The accessory mounting port 19 is positioned in between the first cold shoe mount 6 and the second cold shoe mount 8. This positioning ensures that a piece of equipment or accessory that is mounted into the accessory mounting port 19 does not interfere with a piece of equipment or accessory that is mounted into the first cold shoe mount 6 and/or the second cold shoe mount 8. As shown in FIG. 1 and FIG. 2, an entry opening 9 of the second cold shoe mount 8 is oriented perpendicular to an entry opening 7 of the first cold shoe mount 6. The perpendicular orientation of the first cold shoe mount 6 and the second cold shoe mount 8 is particularly suitable for accessories such as microphones as a perpendicular orientation of two microphones ensures superior sound quality. Additionally accessories such as lighting units may be oriented perpendicularly in order to enhance the lighting effect in multiple directions.

With reference to FIGS. 1-4, in the preferred embodiment of the present invention, the entry opening 7 of the first cold shoe mount 6 is coincident with the first base 2. This allows a piece of equipment or accessory to be mounted to the first cold shoe mount 6 by sliding the piece of equipment or accessory into the entry opening 7 of the first cold shoe mount 6 from the first base 2. The entry opening 9 of the second cold shoe mount 8 is coincident with a lateral surface 4 of the prism body 1. As such, a piece of equipment or accessory may be slid into the entry opening 9 of the second cold shoe mount 8 from the lateral surface 4.

The at least one cold shoe mount 5 comprises a first rail 10, a second rail 11, and a slot 12. The first rail 10 and the second rail 11 are able to support a piece of equipment or accessory and prevent the piece of equipment or accessory from falling out of the slot 12. The slot 12 traverses into the prism body 1, allowing the piece of equipment or accessory to be partially nested into the prism body 1. The first rail 10 and the second rail 11 are connected along the slot 12 allowing the first rail 10 and the second rail 11 to support a piece of equipment or accessory along the length of the slot 12. The first rail 10 and the second rail 11 are positioned opposite to each across the slot 12, forming a track to support the piece of equipment or accessory.

The present invention further comprises a secondary camera mount 15. The secondary camera mount 15 allows an additional camera (such as a GoPro camera) to be mounted to the prism body 1. The secondary camera mount 15 is connected adjacent to the prism body 1, allowing the additional camera to be mounted to the exterior of the prism body 1. The present invention further comprises a fastener-receiving hole 20. The fastener-receiving hole 20 is utilized to receive a threaded fastener in order to secure a camera (such as a GoPro camera) to the secondary camera mount 15. The secondary camera mount 15 comprises a plurality of tabbed threads 16 and a plurality of gaps 17. The plurality of tabbed threads 16 and the plurality of gaps 17 allow a corresponding mounting component (such as a GoPro camera mounting arm) to be secured to the plurality of tabbed threads 16. The plurality of gaps 17 is interspersed amongst the plurality of tabbed threads 16, allowing the mounting component to interlock with the secondary camera mount 15. A threaded fastener may then be inserted through the plurality of tabbed threads 16 and the external mounting component in order to secure the secondary camera to the present invention. As such, the fastener-receiving hole 20 traverses through the plurality of tabbed threads 16, allowing the threaded fastener to pass through each of the plurality of tabbed threads 16. In the preferred embodiment of the present invention, the plurality of tabbed threads 16 is laterally connected to the prism body 1 in between the first cold shoe mount 6 and the second cold shoe mount 8. This ensures that the mounted secondary camera does not physically impair or interfere with a piece of equipment or accessory that is mounted to the first cold shoe mount 6 and/or the second cold shoe mount 8.

Although the present invention has been explained in relation to its preferred embodiment, it is understood that many other possible modifications and variations can be made without departing from the spirit and scope of the present invention as hereinafter claimed.

What is claimed is:

1. A camera and accessory mounting adapter comprises:
a prism body;
at least one cold shoe mount;
a female threading;
a hex head bolt receiving hole;
an adapter mounting cavity;
an accessory mounting port;
the prism body comprises a first base and a second base;
the adapter mounting cavity traversing into the prism body from the second base;
the hex head bolt receiving hole traversing through the prism body from the adapter mounting cavity and the first base;
the female threading being helically integrated into the adapter mounting cavity;
the accessory mounting port laterally traversing through the prism body;
the at least one cold shoe mount being laterally integrated into the prism body;
the at least one cold shoe mount comprises a first cold shoe mount and a second cold shoe mount;
the first cold shoe mount being laterally integrated into the prism body;

the second cold shoe mount being laterally integrated into the prism body, opposite to the first cold shoe mount;
the accessory mounting port being positioned in between the first cold shoe mount and the second cold shoe mount; and
an entry opening of the second cold shoe mount being oriented perpendicular to an entry opening of the first cold shoe mount.

2. The camera and accessory mounting adapter as claimed in claim 1 further comprises:
the entry opening of the first cold shoe mount being coincident with the first base; and
the entry opening of the second cold shoe mount being coincident with a lateral surface of the prism body.

3. The camera and accessory mounting adapter as claimed in claim 1 further comprises:
the at least one cold shoe mount further comprises a first rail, a second rail, and a slot;
the slot laterally traversing into the prism body;
the first rail and the second rail being connected along the slot; and
the first rail and the second rail being positioned opposite to each other across the slot.

4. The camera and accessory mounting adapter as claimed in claim 1 further comprises:
the accessory mounting port being oriented perpendicular to the adapter mounting cavity and the hex head bolt receiving hole.

5. The camera and accessory mounting adapter as claimed in claim 4 further comprises:
the hex head bolt receiving hole being intersected by the accessory mounting port.

6. The camera and accessory mounting adapter as claimed in claim 1 further comprises:
a secondary camera mount; and
the secondary camera mount being connected adjacent to the prism body.

7. The camera and accessory mounting adapter as claimed in claim 6 further comprises:
a fastener-receiving hole;
the secondary camera mount comprises a plurality of tabbed threads and a plurality of gaps;
the plurality of gaps being interspersed amongst the plurality of tabbed threads;
the fastener-receiving hole traversing through the plurality of tabbed threads; and
the plurality of tabbed threads being laterally connected to the prism body in between a first cold shoe mount and a second cold shoe mount.

8. The camera and accessory mounting adapter as claimed in claim 6 further comprises:
the at least one cold shoe mount comprises a first cold shoe mount and a second cold shoe mount;
the first cold shoe mount being laterally integrated into the prism body;
the second cold shoe mount being laterally integrated into the prism body, opposite to the first cold shoe mount;
the accessory mounting port being positioned in between the first cold shoe mount and the second cold shoe mount; and
an entry opening of the second cold shoe mount being oriented perpendicular to an entry opening of the first cold shoe mount.

9. The camera and accessory mounting adapter as claimed in claim 8 further comprises:
the entry opening of the first cold shoe mount being coincident with the first base; and
the entry opening of the second cold shoe mount being coincident with a lateral surface of the prism body.

10. The camera and accessory mounting adapter as claimed in claim 8 further comprises:
the at least one cold shoe mount further comprises a first rail, a second rail, and a slot;
the slot laterally traversing into the prism body;
the first rail and the second rail being connected along the slot; and
the first rail and the second rail being positioned opposite to each other across the slot.

11. The camera and accessory mounting adapter as claimed in claim 8 further comprises:
the accessory mounting port being oriented perpendicular to the adapter mounting cavity and the hex head bolt receiving hole.

12. The camera and accessory mounting adapter as claimed in claim 11 further comprises:
the hex head bolt receiving hole being intersected by the accessory mounting port.

13. The camera and accessory mounting adapter as claimed in claim 8 further comprises:
a fastener-receiving hole;
the secondary camera mount comprises a plurality of tabbed threads and a plurality of gaps;
the plurality of gaps being interspersed amongst the plurality of tabbed threads;
the fastener-receiving hole traversing through the plurality of tabbed threads; and
the plurality of tabbed threads being laterally connected to the prism body in between a first cold shoe mount and a second cold shoe mount.

14. A camera and accessory mounting adapter comprises:
a prism body;
at least one cold shoe mount;
a female threading;
a hex head bolt receiving hole;
an adapter mounting cavity;
an accessory mounting port;
a secondary camera mount;
the prism body comprises a first base and a second base;
the adapter mounting cavity traversing into the prism body from the second base;
the hex head bolt receiving hole traversing through the prism body from the adapter mounting cavity and the first base;
the female threading being helically integrated into the adapter mounting cavity;
the accessory mounting port laterally traversing through the prism body;
the at least one cold shoe mount being laterally integrated into the prism body;
the secondary camera mount being connected adjacent to the prism body;
the accessory mounting port being oriented perpendicular to the adapter mounting cavity and the hex head bolt receiving hole; and
the hex head bolt receiving hole being intersected by the accessory mounting port.

15. The camera and accessory mounting adapter as claimed in claim 14 further comprises:
the at least one cold shoe mount comprises a first cold shoe mount and a second cold shoe mount;
the first cold shoe mount being laterally integrated into the prism body;
the second cold shoe mount being laterally integrated into the prism body, opposite to the first cold shoe mount;

the accessory mounting port being positioned in between the first cold shoe mount and the second cold shoe mount;

an entry opening of the second cold shoe mount being oriented perpendicular to an entry opening of the first cold shoe mount;

the entry opening of the first cold shoe mount being coincident with the first base; and the entry opening of the second cold shoe mount being coincident with a lateral surface of the prism body.

16. The camera and accessory mounting adapter as claimed in claim 15 further comprises:

the at least one cold shoe mount further comprises a first rail, a second rail, and a slot;

the slot laterally traversing into the prism body;

the first rail and the second rail being connected along the slot; and the first rail and the second rail being positioned opposite to each other across the slot.

17. The camera and accessory mounting adapter as claimed in claim 15 further comprises:

a fastener-receiving hole;

the secondary camera mount comprises a plurality of tabbed threads and a plurality of gaps;

the plurality of gaps being interspersed amongst the plurality of tabbed threads;

the fastener-receiving hole traversing through the plurality of tabbed threads; and the plurality of tabbed threads being laterally connected to the prism body in between a first cold shoe mount and a second cold shoe mount.

* * * * *